United States Patent
Chen et al.

[11] Patent Number: 6,158,681
[45] Date of Patent: Dec. 12, 2000

[54] LOW SHEARING CURVED SURFACE GRANULATOR FOR BULK FEEDING

[75] Inventors: Guanzhi Chen; Hongjian Ji; Xin Zhang, all of Changchun, China

[73] Assignee: Changchun Institute of Applied Chemistry, Chinese Academy of Sciences of China, Changchun, China

[21] Appl. No.: 09/112,598

[22] Filed: Jul. 9, 1998

[30] Foreign Application Priority Data

Mar. 24, 1998 [CN] China .................................. 98 2 08531

[51] Int. Cl.[7] .................................................. B02C 19/12
[52] U.S. Cl. .................................... 241/185.5; 241/186.4; 241/186.5; 241/248; 241/260.1; 241/280
[58] Field of Search .................................. 241/260.1, 280, 241/281, 224, 222, 248, 245, 185.5, 186.2, 186.4, 186.5; 403/113, 116

[56] References Cited

U.S. PATENT DOCUMENTS

| | | | |
|---|---|---|---|
| 2,653,350 | 9/1953 | Piperoux | 425/313 |
| 3,341,137 | 9/1967 | Rettenmaier | 241/222 |
| 3,680,798 | 8/1972 | Moser et al. | 241/93 |
| 4,171,103 | 10/1979 | Rossler | 241/152 |
| 4,205,798 | 6/1980 | Bang | 241/224 |
| 5,052,912 | 10/1991 | Masao | 425/313 |

FOREIGN PATENT DOCUMENTS

| | | |
|---|---|---|
| 85103043 | 10/1986 | China . |
| 0 393 272 A1 | 10/1990 | European Pat. Off. . |
| 253201 | 4/1912 | Germany ............................ 241/245 |
| 146635 | 2/1981 | Germany ............................ 241/280 |
| 53-133263 | 11/1978 | Japan . |

*Primary Examiner*—John M. Husar
*Attorney, Agent, or Firm*—Patterson, Thuente & Skaar, P.A.

[57] ABSTRACT

A low shearing curved surface granulator for bulk feed consists of a feeding mechanism and a granulating mechanism; wherein the mainbody of the feeding mechanism is a cylindrical body, the main part of the granulating mechanism is a groove pipe with flanges on both its ends, the groove pipe is longitudinally mounted on the cylindrical body, and the granulator is provided with a ball comber board and a ball scraper. A sector plate is mounted parallel to the cylindrical body on the inner cavity baseplane of the cylindrical body in the feeding mechanism; a driving wheel is set up under the sector plate; a sliding pin is fastened in the driving wheel; the sliding pin fits in with a slide way opened on the sector plate, which slides up and down in the slide way following rotating of the driving wheel, and the sector plate is made to swing repeatedly around the pin in the cylindrical body. The granulator performs massive feeding in one time, can greatly reduce labor. The granulator of the present invention provides for granulation of large quantities of material in a single feeding. This greatly reduces labor and increases granulation efficiency.

8 Claims, 2 Drawing Sheets

LOW SHEARING CURVED SURFACE GRANULATOR FOR BULK FEEDING

This invention relates to a granulation device for viscoelastic polymer gel. Specifically, it is providing a granulator for viscoelastic gel such as polyacrylamide, especially a granulator having low shearing curved surface for bulk material feeding.

The type of viscoelastic gel such as polyacrylamide acquired by polymerization from aqueous solution with medium concentration is liable to molecular weight degradation and the process of granulation is inconvenient in granulation. Generally, the gel shall be cut into strips or patches weighing a few kilograms, then they are placed into the hopper of a mangling screw extruder, step by step, and granulation is being accompanied with feeding. Prior art approaching the invention, such as granulating machine for plastics reported in American patent U.S. Pat. No. 2,653,350 and Japanese Laid-open SHO No. 53-133263 employs screw granulation, wherein an extended granulation moulding device along the advanced direction of screw extrusion is installed. Then a granulating method for polyacrylamide jelly has been disclosed in Chinese patent application No. CN 85,103,043 which utilizes side discharge in screw extrusion; a plurality of small holes are opened on a rotating outer cylinder; and the extruded jelly is cut into pellets by a cutter. The common feature of the aforementioned granulators is side discharge on granulation but the problems in granulation process like large mechanical shearing, massive product molecular weight degradation are unsettled. Particularly in the feeding process of granulator, problems of high labor intensity, slow velocity and disability in bulk feeding occurred.

The object of the invention is designing a bulk feeding granulator having a low shearing curved surface to solve the existing problems of prevailing granulators for polyacrylamide viscoelastic gel, especially the problems of feeding and low labor efficiency in the devices.

The low shearing curved surface granulator with bulk feeding according to the present invention consists of feeding mechanism and granulating mechanism, wherein the mainbody of the feeding mechanism is a cylindrical body whose upper part is cavity (feed hopper), a discharge is opened on the lower sidewall of the cylindrical body, and the discharge is butt-joined with a feeding neck of the granulating mechanism; the main part of the granulating mechanism is a groove pipe having a feeding neck opened at its middle part and two flanges on its both ends, a screw propeller is mounted inside the groove pipe, the groove pipe is longitudinally fixed on the cylindrical body, the feeding neck of the groove pipe is butt-joined with the discharge of the cylindrical body, and a closed system in the cylinder and in the groove pipe is formed; it is characterized in that, a sector plate is mounted parallel to the cylindrical body on the cavity baseplane of the cylindrical body of feeding mechanism, on top of the sector plate there is a supporting hole(center of the sector plate),the hole and a sector plate holder of side wall of the cylindrical body are mounted together with a pin, a driving wheel is mounted underneath the sector plate, a sliding pin is fastened on the driving wheel, the sliding pin fits in with a slide way opened on the sector plate, which slides up and down in the slide way following the rotating of the driving wheel, and the sector plate is made to swing repeatedly around the pin in the cylindrical body.

The granulator structure is similar to a conventional screw extruder. Both flanges of the groove pipe are connected with a motor provided with a decelerator and a holed comber board respectively. An inner hole on one end of a screw with a helical impeller is inserted into the decelerator shaft. An axle neck at the other end is supported on a holder whose outer circle fixed in the inner hole of groove pipe, and an anchor shaped three-jaw ball scraper is fixed on the top end, being proximate with the inner surface of a spherical multihole comber board.

The running process of the granulator according to the present invention will be described below. The material is fed into the cavity hopper of cylindrical cavity at one time, the motor enables the driving wheel to rotate through the decelerator to drive the sector plate into swinging ; the viscoelastic material propelled by the sector plate swinging repeatedly is fed continuously into the feeding neck of groove pipe; under extrusion by rotating screw, the material is extruded out from holes of the spherical multihole comber board, and granulation is accomplished by cutting the material into pellets continuously using the three-jaw ball scraper. Since the cylindrical body of the granulator in the present invention may be made larger, more material may be fed into the hopper at one time. Because the material is fed into the groove pipe by the sector plate unceasingly, granulation may be carried out continuously, and the feeding problem is solved; since the spherical comber board employed in the present invention is good in rigidity and large in specific surface area, fabricated comber board is thin and has more bore holes on its surface, so it has the advantages of minor discharge resistance, small mechanical shearing and low energy consumption.

Hereafter the technology of the present invention will be further described with reference to the accompanied drawings.

In the diagrams, 1 is a cylindrical body, 11 is a reflection plate; 12 is a baffle, 2 is a sector plate; 21 is a grooved rail of the sector plate; 22 is sector plate supporting hole; 3 is a driving wheel; 31 is a pin of sliding block; 32 is a sliding block; 4 is a groove pipe; 41 is a screw or screw propeller; 5 is a spherical multihole comber board, 51 is a three-jaw ball scraper; 6 is a pin; 7 is supporting rollers; $R_0$, $R_1$ and $R_2$ are radii of the sector plate, cylindrical body and driving wheel; L is the grooved rail length of sector plate; and E is the central distance between the driving wheel and the cylindrical body.

Figure 1:
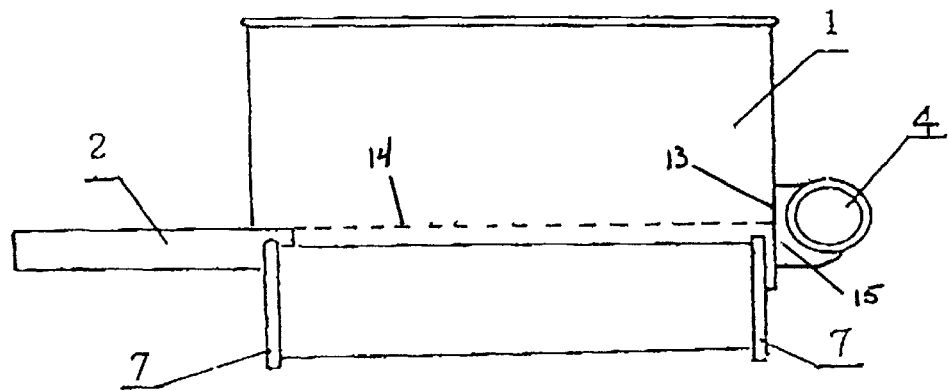
FIG. 1 is a front view of a granulator according to the present invention.
Figure 2:
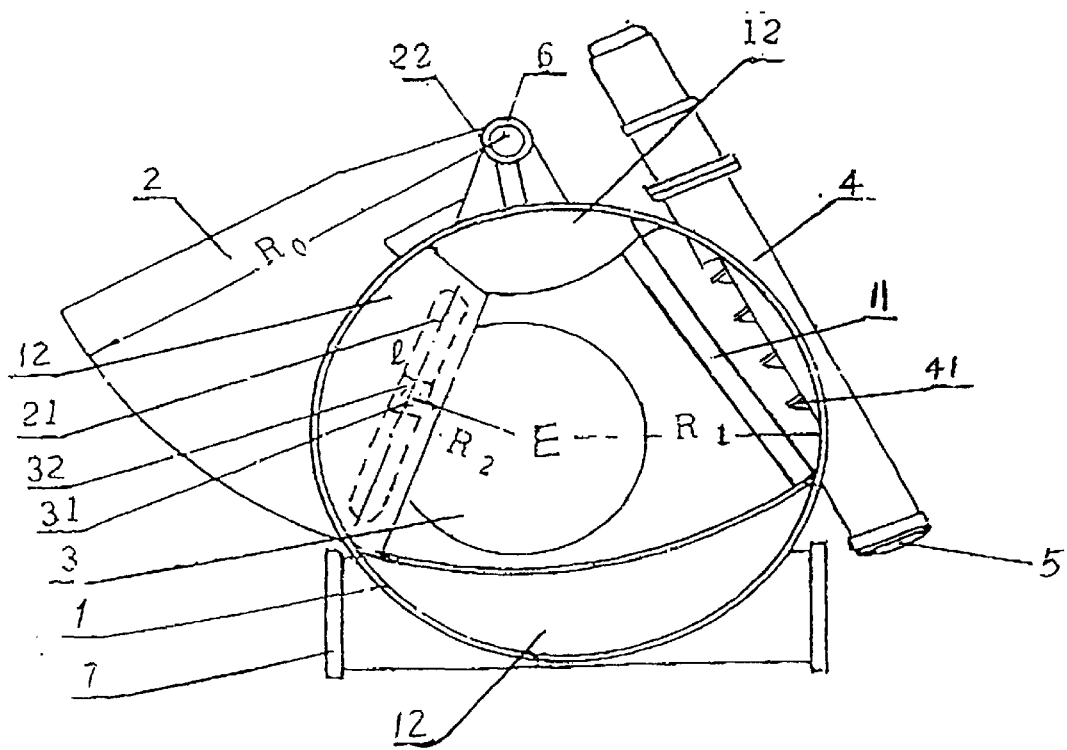
FIG. 2 is a vertical view of a granulator according to the present invention.
Figure 3:
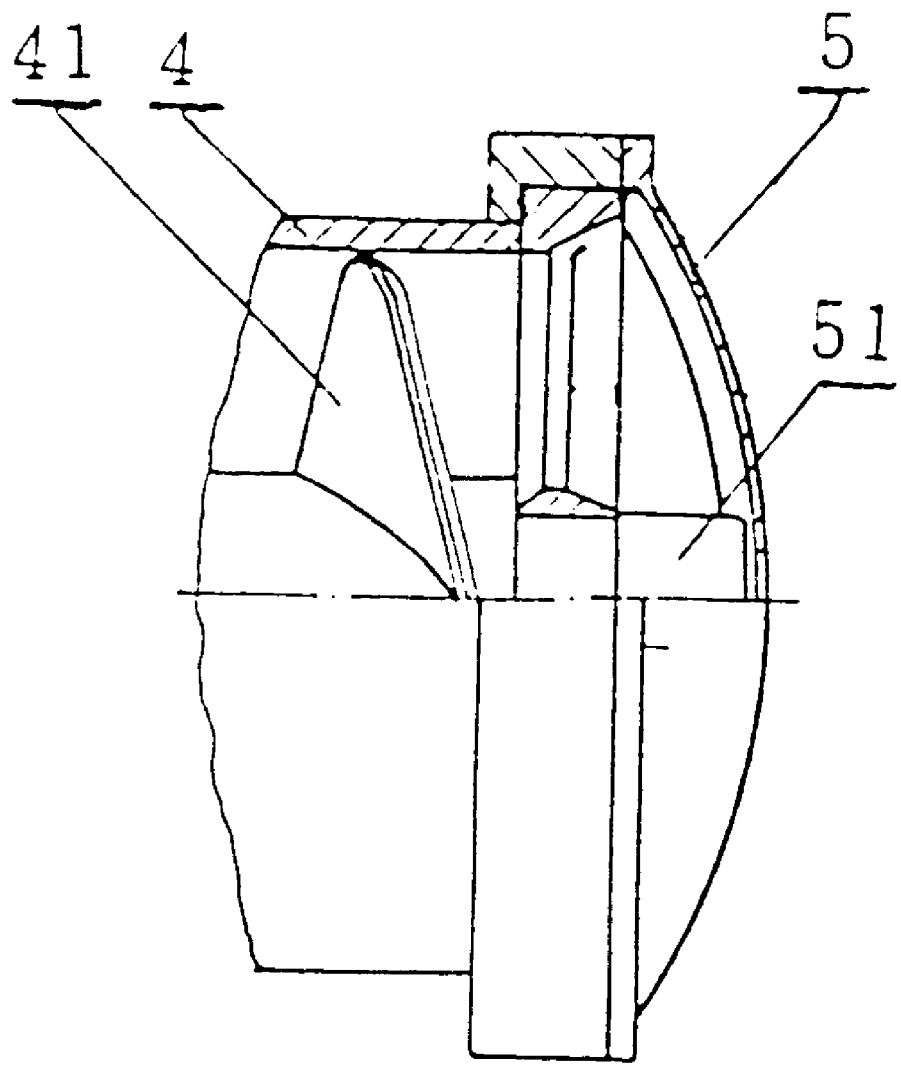
FIG. 3 is a part-sectioned view of a ball scraper of the granulating mechanism in the granulator according to the present invention.

The granuator shown in FIGS. 1, 2 and 3 may be an embodiment of the present invention. From FIGS. 1 to 3, the feeding mechanism in the granulator of the present invention consists of cylindrical body 1, sector plate 2, and driving wheel 3. The cylindrical body 1 is a cylinder with a top opening; the upper cavity of the cylindrical body 1 is a hopper; a discharge 13 is opened at the lower side wall of the cylindrical body 1; the sector plate 2 is mounted parallel to the cylindrical body on the cavity baseplane 14 designated by the dashed line; the sector plate 2 is provided with grooved rail 21 and top supporting hole 22; a holder is set on the cylindrical body 1 corresponding to the top supporting hole 22; the supporting hole 22 is positioned by a pin 6; the lower part of cylindrical body 1 is engrooved corresponding to the side face of the sector plate 2, which enables partial sector face of the sector plate 2 to swing around the pin 6 in the cylindrical body 1; the sector plate 2 located in the cavity of cylindrical body 1 is slotted with grooved rail 21 along the side of the sector; the driving wheel 3 is installed under the sector plate 2; sliding pin 31 fastened on outskirts of the driving wheel 3 is placed in grooved rail 21 of the sector plate; and the driving wheel 3 is driven by a motor with a decelerator (not shown in the diagram). Granulating mechanism consists of a groove pipe 4, a screw 41, a multihole spherical comber board 5, a three-jaw ball scraper 51, and a motor having a decelerator for driving the screw 41. The motor having the decelerator and the multihole spherical comber board 5 are fixed on the flanges at both ends of the groove pipe 4 respectively and the three-jaw ball scraper is mounted on the top end of the driving screw, being proximate to the inner surface of the multihole spherical comber board 5. A feeding neck 15 is opened in the middle part of the groove pipe 4, and the feeding neck 15 is butt-joined (welded) with a discharger 13 of the cylindrical body 1, which enables the cavity of the cylindrical body 1 and the inner cavity of the groove pipe 4 enclosed into a whole. A sloping baffler 12 is set up all around the upper part of sector surface of the cylindrical body 1, a vertical baffler is installed (not shown in the diagram) at the bottom of the cavity corresponding to the outer arc side of the sector plate, which connects to the upper sloping baffle 12, and no dead space is kept at the location of sector plate 2 on the bottom of the cylindrical body 1.

In the granulator of the present invention, both sector plate 2 and driving wheel 3 are important components. As above described, as the driving wheel 3 rotates, the sliding pin 31 fastened on the outskirts of the driving wheel 3 slides up and down in grooved rail 21 of the sector plate 2, which makes the sector plate 2 swing repeatedly. Therefore, the length L of the sector plate grooved rail 21 and radius $R_2$ of the sliding pin 31 of the driving wheel 3 should satisfy the relation $L \geq 2R_2$. Moreover, swinging amplitude of the sector plate 2 is determined by $R_2$ of the driving wheel 3. Although in the present invention the swinging amplitude of the sector plate 2 may not be specially restricted, in order to enable the device to possess a better service performance, the swinging amplitude of the sector plate 2 should not be too small, otherwise the feeding velocity will be too slow. Generally, $R_2 > \frac{1}{3}R_1 + E$ may be adjusted, and the axis of the driving wheel 3 is installed on the left side (corresponding to the side of the discharger)departing from the center of cylindrical body 1. Also the driving wheel 3 cannot be too big, in this way grooved rail length 21 of the sector plate 2 will be elongated, and the relatively suitable range is $\frac{2}{3}R_1 + E \geq R_2 \geq \frac{1}{3}R_1 + E$.

The sliding pin 31 on the driving wheel 3 in the present invention slides frequently in grooved rail 21, therfore the sliding pin 31 is liable to wearing. In order to be more convenient in sliding pin replacement, the sliding pin is designed as composing of a pin 31 and sliding block 32; the sliding block 32 covering the pin 31 is placed in grooved rail 21, which enables the sliding block 32 to slide along the grooved rail 21.

No special limitations have been imposed on the size of the sector plate 2 in the present invention. In designing the driving wheel 3, the sector plate dimensions should be considered relevant. When the length of the grooved rail 21 on the sector plate 2 is determined, the radius of the sector is increased appropriately to ensure sufficient intensity at both ends of the grooved rail 21, then the length of inner side edge of the sector plate 2 can be determined. Area of the sector plate 2 should meet the following requirement, i. e. when the sector plate 2 swings to the discharger 13 of cylindrical body 1 (the farthest right side), partial sector surface on the outer side of the sector plate 2 remains in the exterior of the cylindrical body 1 to ensure hermeticity of the cylindrical body 1.

In addition, feeding quantity may also be influenced by the thickness of the sector plate 2, which is generally selected to be not smaller than the opening width of the feeding neck 15 of the grooved pipe. Naturally, the length of the feeding neck 15 shall not exceed the inside length of the sector plate 2. Since the sector plate 2 is inclined at an angle, on swinging to the discharger side, in order that the inside surface of the sector plate 2 is engaged with the discharger 13 correspondingly, the groove pipe 4 on mounting should also be tilted towards the inner surface of the sector plate 2.

The granulating mechanism of the present invention is similar to the conventional screw extrusion granulating mechanism. In order to reduce mechanical shearing, however, thickness of the multihole comber should be as thin as possible, while specific surface area shall as large as possible. In the granulating mechanism of the present invention, a conventional planar multihole comber board is replaced by the multihole spherical comber board 5, and the three-jaw scraper 51 is also replaced by a spherical scraper. Meanwhile, since the multihole comber board of the present invention is assembled onto the groove pipe 4, comber boards having a variety of apertures may be installed, which enables the granulator to adapt to fabricating various granular material products.

The granulator of the present invention may be directly installed on a platform, or for the sake of convenience, supporting rollers 7 can be added to the bottom of the cylindrical body 1, and the machine is modified to be a movable granulator. All other mechanism and parts of the granulator in the present invention may be fabricated or assembled referring to the conventional technology. Mean while, material for constructing The granulator may also be selected according to that for the conventional granulators, for example, a cast-iron wheel coated with teflon may be used for the driving wheel 3, carbon steel may be employed for the pins 31.6, teflon may be adopted for the sliding block 32, and all other parts may be made from stainless steel.

The granulator of the present invention is more suitable for large scale industrial production. In order to speed up granulation velocity and accomplish continuous drying from automatic material dissemination to mesh belt transportation, the granulator of the present invention may be suitably improved according to prior art, and a granulating device with side discharge may be directly installed on the flange of the groove pipe 4 in the present invention. Because of the bulk feeding at one time in the present invention, labor intensity may be greatly reduced, and granulating efficiency will be increased.

What is claimed is:

1. A low shearing curved surface granulator for bulk feeding, comprising a feeding mechanism and a granulating mechanism;

said feeding mechanism includes a cylindrical body, whose upper part is a cavity and whose lower side wall has a cavity discharger; a sector plate mounted parallel to the cylindrical body on a cavity baseplane of the cylindrical body and adjoined to the cylindrical body by a supporting holder that includes a supporting hole, wherein the cylindrical body and the sector plate are adjoined with a pin; and a driving wheel mounted under the sector plate and including a sliding pin fastened on the driving wheel and fitting in a grooved rail on the sector plate, wherein the sliding pin slides up and down in the slide slot following the rotation of the driving wheel and the sector plate is made to swing repeatedly in the cylindrical body; and said granulating mechanism includes a groove pipe longitudinally mounted on the cylindrical body, with a feeding neck opened in its middle part and butt-joined to the discharger of the cylindrical body; a screw propeller installed in the groove pipe, a multihole comber board adjoined to one end of the groove pipe and a three jaw scraper adjacent to the multihole comber board.

2. The granulator according to claim 1, wherein a reflection plate(11) is mounted over the cavity discharger of the cylindrical body(1).

3. The granulator according to claim 1, wherein a length L of the sector plate grooved rail (21) and radius R2 of the sliding pin on the driving wheel(3) should satisfy the relation $L \geq 2R_2$.

4. The granulator according to claim 1, wherein radius $R_2$ of the driving wheel (3) and radius R1 of the cylindrical body (1) fulfill the relation $\frac{2}{3}R_1 + E \geq R2 \geq \frac{1}{3}R_1 + E$.

5. The granulator according to claim 1, wherein the sliding pin consists of a pin (31) and a sliding block(32); the sliding block(32) covering the pin(31) is placed in the grooved rail(21).

6. The granulator according to claim 1, wherein a multihole comber board is manufactured into a multihole spherical comber board (5), and a three-jaw scraper(51) is also a ball scraper.

7. The granulator according to claim 1 wherein the lower part of the cylindrical body is engrooved to correspond to a side face of he sector plate.

8. The granulator according to claim 1, wherein one or more baffles(12) are set around the cavity of the cylindrical body.

* * * * *